Dec. 13, 1966 C. W. PRIBUS 3,291,355
FILM SPROCKET SLIP CLUTCH OPERATION
FOR SINGLE FRAME PROJECTION
Filed Sept. 10, 1964

CLARENCE W. PRIBUS
INVENTOR.

BY
ATTORNEYS 3,291,355
FILM SPROCKET SLIP CLUTCH OPERATION FOR SINGLE FRAME PROJECTION
Clarence William Pribus, Rochester, N.Y., assignor to Eastman Kodak Company, Rochester, N.Y., a corporation of New Jersey
Filed Sept. 10, 1964, Ser. No. 395,442
7 Claims. (Cl. 226—66)

The present invention relates to a film drive arrangement and more particularly to a film transport system useful in a projector for either motion picture operation or projecting single frames of a motion picture film.

Several motion picture projectors have been developed with rather complicated arrangements for projecting a single frame that is to be viewed for a longer period than individual frames of a motion picture sequence. Such still frame projectors usually require a complicated mechanism for stopping the film driving claws and sprockets, so that a single frame may reside for an extended period within the illuminated region of the projector. However, such stopping mechanisms must act rapidly and must overcome substantial inertia, whereby the parts stopped as well as the stopping mechanisms themselves must be of rigid materials to sustain the stress loads resulting from inertia considerations. Thus, there exists a need for a simple stopping mechanism which avoids inertia problems.

Therefore, an object of my invention is to provide a simple and reliable film drive arrangement which may be made ineffective to drive the film.

In accordance with one embodiment of my invention a pair of slipping clutches drive a film through the region of a drive claw which advances the film frame by frame in a conventional manner through a framing aperture so that each frame of a sequence may be viewed on a screen. At such time as a particular frame, to be viewed for a longer period enters the framing mechanism, the claw is prevented from advancing the film whereupon the drive sprockets slip until the claw again advances the film in conventional motion picture operation.

The subject matter which is regarded as my invention is particularly pointed out and distinctly claimed in the concluding portion of this specification. The invention, however, as to its organization and operation, together with further objects and advantages, will best be understood by reference to the following description taken in connection with the accompanying drawing, in which:

Figure 1:
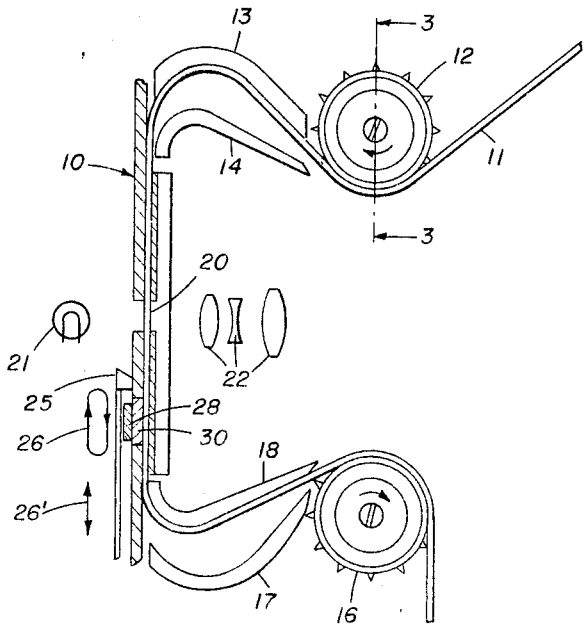
FIG. 1 is a simplified elevation view of one embodiment of my invention.

Referring now to the drawing, wherein like numbers refer to similar parts, I have shown in FIG. 1 a film gate 10 receptive of a film strip 11 presented thereto by means of an input drive sprocket 12 and guide surfaces 13 and 14. The film strip 11 leaves the film guide 10 by means of a second drive sprocket 16 and guides 17 and 18. Near the center of the film gate is provided an aperture 20 which frames the particular portion of the film to be illustrated by a lamp 21 for projecting through a lens system 22.

As usually occurs in motion picture projectors, a claw 25 advances the film discrete distances so that each of a sequence of frames of the film reside in the same portion of the framing aperture 20. In advancing the film, the drive portion of the claw 25 follows a somewhat elliptical pattern as indicated at 26 and is synchronized with a shutter (not shown) in the usual manner.

However, in accordance with my invention the claw 25, upon a command signal, is prevented temporarily from engaging the film. The signal causes a pawl 28 to prevent the claw 25 from moving inward to engage the film whereby the claw simply travels vertically as indicated by the double ended arrow 26'. Thus it becomes apparent that the inertia of the pulldown claw drive system remains substantially undisturbed and there is no necessity of stopping the claw in a specific position or restarting it as a specific time in relation to other portions of the equipment.

Figure 2:
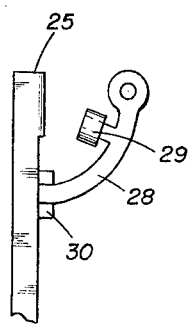
FIG. 2 is a detail view of a portion of the mechanism illustrated in FIG. 1.

As shown more clearly in FIG. 2 the pawl 28 may simply be a wedge-shaped member which is inserted under the claw 25 by a solenoid 29 operable whenever the command signal energizes it. Various means are known to develop a command signal. For instance, electrical means may be arranged to detect coding such as notches or magnetic tabs applied directly to the film strip 11, or signals may be developed by a separate remote-control mechanism energized by the projector operator.

Once the claw 25 is withheld from the film so that the film is not advanced thereby the input portion of the film is driven against the guide 13 by the sprocket 12 whereby it is stopped and the sprocket 12, although providing a continuous driving force, slips to allow the film to remain stationary. Similarly, the output portion of the film strip 11 is driven by the output sprocket 16 until it binds against the guide surface 18 whereby the sprocket 16 also slips and the film remains stationary until the pawl 28 is removed to allow the claw 25 to resume motion picture operation. Holding force in the film resulting from normal film gate tension may be increased by the wedge 28 engaging a pressure plate 30 at the same time it maintains the claw in the raised position. Spring bias for providing the compression of the plate 30 is readily available in the claw itself, at least in such cases where the claw 25 is made of spring material. This is a very common arrangement of film pulldown claws.

It will become readily apparent to those familiar with motion picture projectors that this mechanism is substantially simpler than prior art arrangements for stopping the film 11 to attain a still projection. For instance, the drive mechanisms of the claw 25 need not be regulated in any manner as the claw can continue to move vertically as if it were advancing the film. Similarly, the drive mechanism for the sprockets 12 and 16 may be continuously driven without driving the film through the film gate 10.

Figure 3:
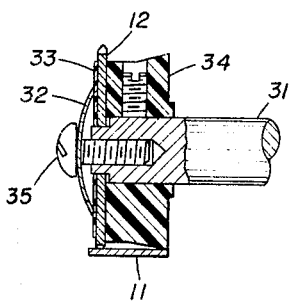
FIG. 3 is a cross-section view taken along lines 3—3 of FIG. 1.

A suitable slipping clutch is indicated in FIG. 3 wherein a drive shaft 31 of the sprocket 12 is continuously rotated to apply torsional force. However, the magnitude of this torque is under the control of the spring washer 32 which clamps the sprocket 12 between a nylon washer 33 and a nylon roller 34, nonrotatably coupled to the shaft 31. Thus the sprocket 12 is sandwiched between the roller 34 and the washer 33, and the driving torque is in accordance with the tension applied to this sandwich by a threaded bolt 35. I prefer that the sprocket 12 be of a metal such as polished stainless steel whereby the frictional engagement between the sprocket 12 and the nylon portions of the device results in a low friction drive. Obviously several "slippery" and stable plastics may be used in place of the nylon materials specified herein. Also the materials may be selected from those classes of materials having relatively low dynamic friction with a slightly higher static friction so that the film will not normally engage the guide surfaces 13, 14, 17 or 18 during motion picture operation.

Since the re-enabling of the pulldown claw 25, will cause the film 11 to again advance frame by frame in synchronism with shutters and the like, no special controls are necessary to restart other portions of the equipment as the sprockets 12 and 16 will automatically restart when the film is moved by the claw 25.

While I have shown particular embodiments of my invention, other modifications may occur to those skilled in this art. Therefore, I intend the appended claims to cover all such modifications that fall within the proper scope of my invention.

I claim:

1. A film drive arrangement for a motion picture projector allowing periodic stoppage of the film for extended illumination and projection of selected frames, comprising:
   a film gate having a framing aperture through which individual frames of the film are illuminated for projection;
   a pulldown claw for engaging and moving the film sequentially through said gate, frame by frame;
   means for temporarily rendering said claw ineffective to engage and move the film;
   drive means for advancing the film to said gate;
   drive means for removing the film from said gate; and
   slipping clutch means associated with each of said drive means operative to slip in response to the torque applied to said drive means when said claw is ineffective to engage and move the film to thereby render said drive means ineffective to advance and remove the film.

2. A film drive arrangement as claimed in claim 1 wherein each of said drive means comprises:
   a continuously rotatable shaft;
   a plastic roller secured to said shaft;
   a plastic washer;
   a sprocket positioned between said roller and said washer to form a sandwich; and
   spring bias means for compressing the sandwich and thus regulating the driving torque of said sprocket.

3. A film drive arrangement as claimed in claim 2 and further including a driving mechanism for said claw, and wherein said means for rendering said claw ineffective to engage and move the film is arranged to prevent engagement of the film by said claw without slowing said driving mechanism whereby the inertia thereof does not develop tension as a result of said claw being rendered ineffective to engage and move the film.

4. A film drive arrangement as in claim 1 having means for increasing the holding force of said film gate on the film when said claw is ineffective to engage and move the film.

5. A film drive arrangement for a motion picture film allowing periodic stoppage of the film for extended illumination and projection of selected frames, comprising:
   a film gate;
   a pulldown claw for engaging and moving the film sequentially through said gate, frame by frame;
   means for temporarily rendering said claw ineffective to engage and move the film to advance a selected frame;
   sprocket drive means for advancing the film to and removing it from said film gate; and
   slipping clutch means associated with said sprocket drive means operative to slip in response to the torque applied to said drive means when said claw is ineffective to engage and move the film to thereby render said drive means ineffective to advance and remove the film.

6. A film drive arrangement as in claim 5 and further including a driving means for said claw, and wherein said means for rendering said claw ineffective to engage and move the film is arranged to prevent engagement of the film by said claw without slowing said driving means for said claw whereby the inertia thereof is not materially changed.

7. A film drive arrangement for a motion picture projector allowing periodic stoppage of the film for extended illumination and projection of selected frames, comprising:
   a film gate having a framing aperture through which individual frames of the film are illuminated for projection;
   a pulldown claw for engaging and moving the film sequentially through said gate, frame by frame;
   means for temporarily rendering said claw ineffective to engage and move the film through said gate;
   drive means for moving the film relative to said gate to be engaged by said claw; and
   slipping clutch means operatively associated with said drive means operative to slip in response to the torque applied to said drive means when said claw is ineffective to engage and move the film to thereby render said drive means ineffective to move the film.

References Cited by the Examiner
UNITED STATES PATENTS

| | | | |
|---|---|---|---|
| 2,097,220 | 10/1937 | Blum | 226—66 |
| 3,063,651 | 11/1962 | Becker et al. | 226—57 X |
| 3,145,614 | 8/1964 | Royston | 352—169 |

M. HENSON WOOD, Jr., *Primary Examiner.*

A. N. KNOWLES, *Assistant Examiner.*